(12) United States Patent
Wisnewski et al.

(10) Patent No.: US 8,583,199 B2
(45) Date of Patent: Nov. 12, 2013

(54) TELEMATICS SYSTEMS AND METHODS WITH MULTIPLE ANTENNAS

(75) Inventors: Mark A Wisnewski, Stockbridge, MI (US); Steven P. Schwinke, Plymouth, MI (US); Sethu K. Madhavan, Erie, PA (US); Ki Hak Yi, Ontario (CA); Eray Yasan, Canton, MI (US)

(73) Assignee: General Motors LLC, Detroit, MI (US)

( * ) Notice: Subject to any disclaimer, the term of this patent is extended or adjusted under 35 U.S.C. 154(b) by 194 days.

(21) Appl. No.: 13/082,225

(22) Filed: Apr. 7, 2011

(65) Prior Publication Data

US 2012/0258705 A1    Oct. 11, 2012

(51) Int. Cl.
H04M 1/00 (2006.01)
H04W 24/00 (2009.01)
H04W 4/00 (2009.01)
H04B 17/00 (2006.01)
H01Q 3/24 (2006.01)
H01Q 1/32 (2006.01)

(52) U.S. Cl.
USPC ............ 455/575.9; 455/423; 455/67.11; 455/569.2; 343/717; 343/876; 370/334

(58) Field of Classification Search
USPC ........... 455/423, 562.1, 13.3, 67.11, 569.1, 455/569.2, 575.1, 575.7, 575.9; 370/334; 343/711, 712, 717, 876
See application file for complete search history.

(56) References Cited

U.S. PATENT DOCUMENTS

| | | | | |
|---|---|---|---|---|
| 4,566,133 A * | 1/1986 | Rambo | ...... | 455/277.2 |
| 4,633,519 A * | 12/1986 | Gotoh et al. | ...... | 455/277.2 |
| 4,823,142 A * | 4/1989 | Ohe et al. | ...... | 343/713 |
| 5,276,920 A * | 1/1994 | Kuisma | ...... | 455/101 |
| 5,329,555 A * | 7/1994 | Marko et al. | ...... | 375/347 |
| 5,481,571 A * | 1/1996 | Balachandran et al. | ...... | 375/347 |
| 5,740,526 A * | 4/1998 | Bonta et al. | ...... | 455/277.2 |
| 5,844,632 A * | 12/1998 | Kishigami et al. | ...... | 348/706 |
| 5,959,584 A * | 9/1999 | Gorham et al. | ...... | 343/711 |
| 6,002,672 A * | 12/1999 | Todd | ...... | 370/252 |
| 6,118,409 A * | 9/2000 | Pietsch et al. | ...... | 343/703 |
| 6,275,194 B1 * | 8/2001 | Ansorge | ...... | 343/713 |
| 6,426,693 B1 * | 7/2002 | Inomata | ...... | 340/539.21 |
| 6,437,577 B1 * | 8/2002 | Fritzmann et al. | ...... | 324/523 |
| 6,449,469 B1 * | 9/2002 | Miyahara | ...... | 455/273 |
| 6,546,259 B1 * | 4/2003 | Vendryes | ...... | 455/513 |
| 6,768,457 B2 * | 7/2004 | Lindenmeier | ...... | 342/374 |
| 7,170,453 B2 * | 1/2007 | Noguchi et al. | ...... | 343/702 |
| 7,499,691 B1 * | 3/2009 | Dunn et al. | ...... | 455/277.2 |
| 7,639,999 B2 * | 12/2009 | Wallace | ...... | 455/277.1 |
| 7,676,202 B2 * | 3/2010 | Anton-Becker | ...... | 455/133 |
| 7,945,214 B2 * | 5/2011 | Kim et al. | ...... | 455/69 |
| 2002/0037707 A1 * | 3/2002 | Yoshioka et al. | ...... | 455/404 |

(Continued)

*Primary Examiner* — Christopher M Brandt

(74) *Attorney, Agent, or Firm* — Ingrassia Fisher & Lorenz, P.C.

(57) ABSTRACT

Vehicle telematics systems and methods for vehicle telematics systems are provided. The telematics system includes a first antenna, a second antenna, and a processing device. The first antenna is disposed at a first location on the vehicle. The second antenna is disposed at a second location on the vehicle. The second location is remote from the first location. The processing device is coupled to the first antenna and the second antenna. The processing device is configured to monitor a parameter that is indicative as to whether the first antenna is operational, communicate using the first antenna if the parameter indicates that the first antenna is operational, and communicate using the second antenna if the parameter indicates that the first antenna is not operational.

14 Claims, 4 Drawing Sheets

(56) References Cited

U.S. PATENT DOCUMENTS

| | | | |
|---|---|---|---|
| 2002/0133293 A1* | 9/2002 | Goldman | 701/213 |
| 2004/0121820 A1* | 6/2004 | Unno et al. | 455/569.2 |
| 2004/0166909 A1* | 8/2004 | Lee | 455/575.7 |
| 2005/0085951 A1* | 4/2005 | Walker et al. | 701/1 |
| 2006/0172712 A1* | 8/2006 | Sievenpiper et al. | 455/101 |
| 2006/0293015 A1* | 12/2006 | Mori et al. | 455/276.1 |
| 2007/0190950 A1* | 8/2007 | Madhavan et al. | 455/99 |
| 2008/0007432 A1* | 1/2008 | Eguchi | 340/988 |
| 2010/0070174 A1* | 3/2010 | Michalek et al. | 701/210 |
| 2010/0207754 A1* | 8/2010 | Shostak et al. | 340/450 |
| 2011/0109262 A1* | 5/2011 | Iizuka et al. | 320/108 |

* cited by examiner

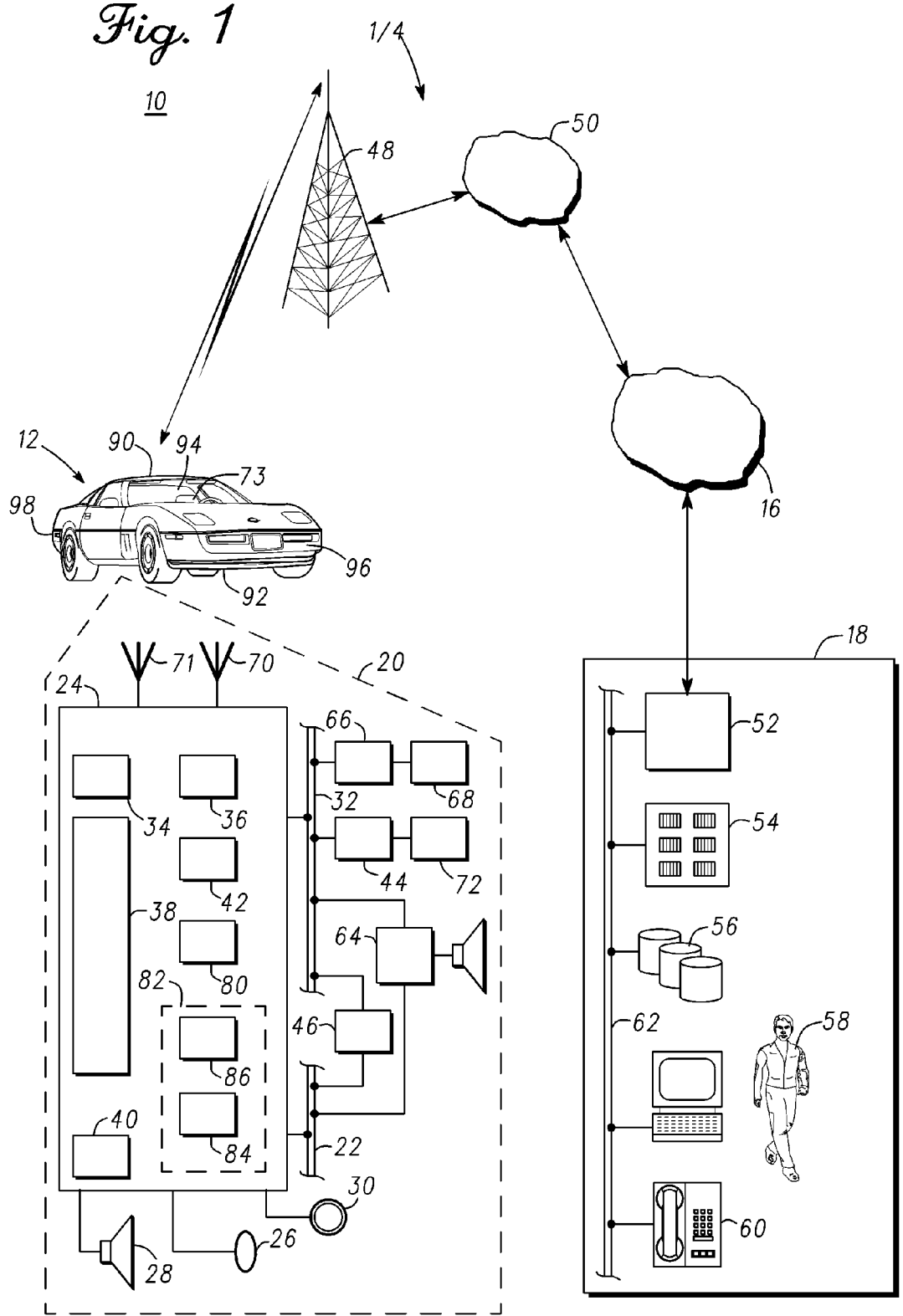

TELEMATICS SYSTEMS AND METHODS WITH MULTIPLE ANTENNAS

TECHNICAL FIELD

The technical field generally relates to vehicles, and, more particularly, to telematics systems for vehicles.

BACKGROUND

Many vehicles in the marketplace are equipped with telematics units. The telematics units often include an antenna, such as a cellular antenna, for communicating with a call center. The cellular antenna is often disposed on a rooftop of the vehicle. The telematics unit communicates with the call center using the cellular antenna in a variety of circumstances, including when an accident has been detected and/or the occupants of the vehicle may otherwise request assistance. However, in certain instances, such as in a rollover accident, the cellular antenna may not be operating in an optimal fashion.

Accordingly, it is desirable to provide improved telematics systems, for example, systems that provide for improved communications when a primary antenna is not operating properly. It is also desirable to provide improved methods for telematics systems, for example that provide for improved communications when a primary antenna is not operating properly. Furthermore, other desirable features and characteristics of the present invention will become apparent from the subsequent detailed description and the appended claims, taken in conjunction with the accompanying drawings and the foregoing technical field and background.

SUMMARY

In accordance with one example, a telematics system for a vehicle is provided. The telematics system comprises a first antenna, a second antenna, and a processing device. The first antenna is disposed at a first location on the vehicle. The second antenna is disposed at a second location on the vehicle. The second location is remote from the first location. The processing device is coupled to the first antenna and the second antenna. The processing device is configured to monitor a parameter that is indicative as to whether the first antenna is operational, communicate using the first antenna if the parameter indicates that the first antenna is operational, and communicate using the second antenna if the parameter indicates that the first antenna is not operational.

In accordance with another example, a method for communicating via a telematics system of a vehicle, the telematics system having a first antenna disposed at a first location of the vehicle and a second antenna disposed at a second antenna disposed at a second location of the vehicle that is remote from the first location, is provided. The method comprises the steps of monitoring a parameter that is indicative as to whether the first antenna is operational, communicating using the first antenna if the parameter indicates that the first antenna is operational, and communicating using the second antenna if the parameter indicates that the first antenna is not operational.

In accordance with a further example, a telematics system for a vehicle is provided. The telematics system comprises a first antenna, a second antenna, a cellular chipset, and a processing device. The first antenna is disposed at a first location on the vehicle. The first location is disposed on a first side of the vehicle. The second antenna is disposed at a second location on the vehicle. The second location is remote from the first location, and is disposed on a second side of the vehicle that is remote from the first side. The cellular chipset is configured to direct communications to a call center using the first antenna or the second antenna. The processing device is coupled to the cellular chipset, the first antenna, and the second antenna. The processing device is configured to monitor a parameter that is indicative as to whether the first antenna is operational, communicate with the call center using the cellular chipset and the first antenna if the parameter indicates that the first antenna is operational, and communicate with the call center using the cellular chipset and the second antenna if the parameter indicates that the first antenna is not operational.

BRIEF DESCRIPTION OF THE DRAWINGS

Certain examples of the present disclosure will hereinafter be described in conjunction with the following drawing figures, wherein like numerals denote like elements, and wherein:

FIG. 1 is a schematic illustration of a non-limiting example of a communication system, including a telematics unit, for a vehicle;

DETAILED DESCRIPTION

Figure 2A:
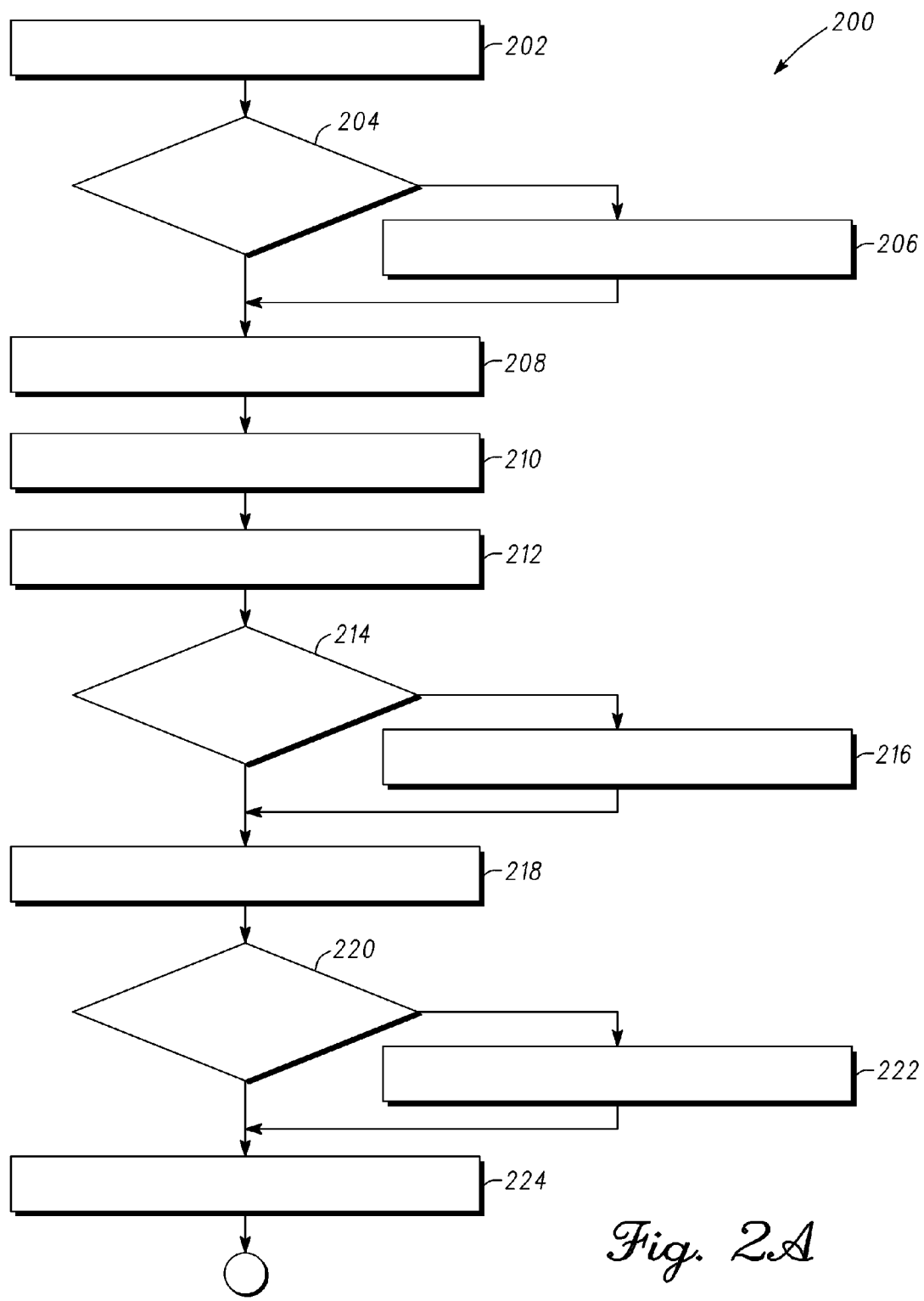
FIG. 2 is a flowchart of a non-limiting example of a process for communicating using a telematics system, such as the telematics system of FIG. 1.

The following detailed description is merely exemplary in nature, and is not intended to limit the disclosure or the application and uses thereof. Furthermore, there is no intention to be bound by any expressed or implied theory presented in the preceding technical field, background, or the following detailed description.

With reference to FIG. 1, there is shown a non-limiting example of a communication system 10. The communication system 10 generally includes a vehicle 12, a wireless carrier system 14, a land network 16, a call center 18, and a telematics unit 24 having an electronic processing device 38, a cellular chipset/component 34, and multiple antennas 70, 71. The telematics unit 24 utilizes the multiple antennas 70, 71 in a manner that provides for communications to the call center 18 even in situations, such as a rollover accident, in which one of the antennas 70, 71 may be damaged or otherwise not operating properly. As used throughout this application, an antenna is deemed to be operating properly if it is determined that the antenna is (or is likely to be) operational, that is, fully capable of communicating with the call center under current conditions and circumstances.

It should be appreciated that the overall architecture, setup and operation, as well as the individual components of the illustrated system are merely exemplary and that differently configured communication systems may also be utilized to implement the examples of the systems and methods disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, and the like, and is equipped with suitable hardware and software that enables it to communicate over communication system 10. Some of the vehicle hardware 20 is shown generally in FIG. 1 including the telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 includes the above-referenced electronic processing device 38 and cellular chipset/component 34, in addition to a global positioning system (GPS) chipset/component 42, among other features described further below. The cellular chipset/component 34 directs communications from the electronic processing device 38 to the call center 18 via a wireless network (namely, the wireless carrier system 14 described below). The GPS chipset/component 42 provides information as to a current geographic location of the vehicle.

The telematics unit 24 also comprises and/or is implemented in connection with a telematics system having a primary antenna 70, a secondary antenna 71, an antenna switch 80, telematics unit sensors 82, and vehicle collision sensors 68 and collision sensor interface modules 66. The vehicle collision sensors 68 and collision sensor interface modules 66 may be collectively referred to as an accident detection unit for the vehicle, for example as part of a rollover detection system for the vehicle.

The electronic processing device 38 utilizes the primary antenna 70 to communicate with the call center 18 via the cellular chipset/component 34 and the wireless network during normal operation of the communication system 10 and the telematics unit 24. The electronic processing device 38 utilizes the secondary antenna 71 to communicate with the call center 18 via the cellular chipset/component 34 and the wireless network in situations, such as a rollover accident, in which it is determined that the primary antenna 70 is likely to not be operating properly. In addition, the electronic processing device 38 utilizes a cellular telephone 73 of an occupant of the vehicle to communicate with the call center 18 via the cellular chipset/component 34 and the wireless network in situations in which it is determined that neither the primary antenna 70 nor the secondary antenna 71 are operating properly.

The electronic processing device 38 switches between the primary and secondary antennas 70, 71 utilizing the antenna switch 80 based on information obtained from the GPS chipset/component 42, the telematics unit sensors 82, the vehicle collision sensors 68, and the collision sensor interface modules 66. Specifically, the telematics unit sensors 82 are associated with the primary antenna 70, and preferably include a resistive sensor 84 of a resistor that measures a voltage or current associated with the primary antenna 70, and a signal strength sensor 86 that measures a strength of signals received via the primary antenna 70 from cell towers 48 via the wireless network. Additional telematics unit sensors 82 may similarly be associated with the secondary antenna 71 in certain examples. The vehicle collision sensors 68 measure parameter values pertaining to whether the vehicle has been in an accident (or a particular type of accident, such as a rollover accident), and the collision sensor interface modules 66 make determinations as to whether the vehicle has been in an accident using the parameter values measured by the vehicle collision sensors 68. In addition, in certain examples, measurements, parameter values, and determinations from the GPS chipset/component 42, and/or from other vehicle sensors 72 (such as an accelerometer) and other vehicle sensor interface modules 44, may also be utilized.

The electronic processing device 38 uses these various measurements, parameter values, and determinations in making a determination as to whether the primary antenna 70 is operating properly. If it is determined that the primary antenna 70 is operating properly, then the antenna switch 80 is set to a first position, such that the electronic processing device 38 communicates with the call center 18 using the cellular chipset/component 34 and the primary antenna 70 via the wireless network. Conversely, if it is determined that the primary antenna 70 is not operating properly, then the antenna switch 80 is set to a second position, such that the electronic processing device 38 communicates with the call center 18 using the cellular chipset/component 34 and the secondary antenna 71 via the wireless network.

The primary and secondary antennas 70, 71 are coupled to the telematics unit 24 (preferably, to the antenna switch 80 thereof) via coaxial cables. The primary antenna 70 is disposed at a first location on the vehicle, and the secondary antenna 71 is disposed at a second location on the vehicle. The first location is remote from the second location, so that the primary and secondary antennas 70, 71 are remote from one another. Accordingly, if the primary antenna 70 is damaged, for example during a rollover accident, the secondary antenna 71 is likely to be undamaged due to its remote location.

Specifically, the primary and secondary antennas 70, 71 are preferably disposed at respective locations on different sides of the vehicle (for example, comprising a front side, a rear side, a top side, and a bottom side of the vehicle), and preferably face different directions. In certain examples, the primary antenna 70 is disposed on a roof 90 or an upper portion of a front windshield 94 of a vehicle facing substantially upward (above the vehicle), and the secondary antenna 71 is disposed on a bottom portion 92 underneath the vehicle facing substantially downward (below the vehicle). In certain other examples, the primary antenna 70 is disposed on the roof 90 or upper portion of the front windshield 94 facing substantially upward (above the vehicle), and the secondary antenna 71 is disposed on a front bumper 96 of the vehicle facing substantially forward (in front of the vehicle). In certain other examples, the primary antenna 70 is disposed on the roof 90 or upper portion of the front windshield 94 facing substantially upward (above the vehicle), and the secondary antenna 71 is disposed on a rear bumper 98 of the vehicle facing substantially backward (behind the vehicle).

The telematics unit 24 is an onboard device that provides a variety of services through its communication with the call center 18, and generally includes, in addition to the above-referenced electronic processing device 38, cellular chipset/component 34, and antennas 70, 71, a wireless modem 36, one or more types of electronic memory 40, and a navigation unit containing the GPS chipset/component 42. In one example, the wireless modem 36 includes a computer program and/or set of software routines adapted to be executed within the electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various accident, crash, and/or collision sensor interface modules 66 and collision sensors 68 located throughout the vehicle; and/or infotainment-related services where music, Internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Antennas 70, 71 both preferably comprise dual mode antennas that service the GPS chipset/component 42 and the cellular chipset/component 34.

Microphone 26 provides the driver or other vehicle occupant with a means for inputting verbal or other auditory commands, and can be equipped with an embedded voice processing device utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware 20 components. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision sensor interface modules 66 are operatively connected to the vehicle bus 32. The collision sensors 68 provide information to the telematics unit via the crash and/or collision sensor interface modules 66 regarding the occurrence, type, and severity of a vehicle collision, such as the angle of impact and the amount of force sustained.

Vehicle sensors 72, connected to various sensor interface modules 44, are operatively connected to the vehicle bus 32. Exemplary vehicle sensors include but are not limited to gyroscopes, accelerometers, magnetometers, emission detection, and/or control sensors, and the like. Exemplary sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cellular (cell) towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2B:
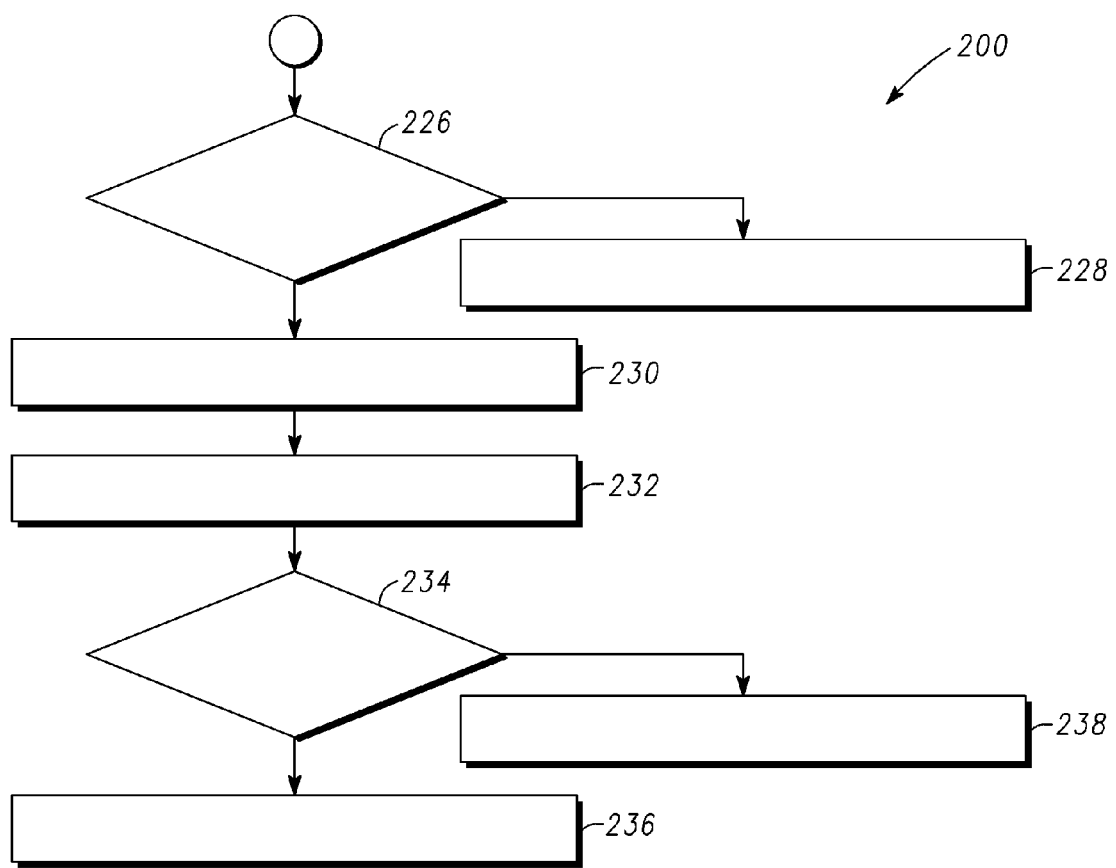

FIG. 2 is an exemplary schematic illustration of a non-limiting example of a process 200 for communicating using a telematics system having multiple antennas. The process 200 can be implemented in connection with the communication system 10 of FIG. 1, including the telematics unit 24 and antennas 70, 71 thereof.

As depicted in FIG. 2, the process 200 includes the step of measuring a voltage or current associated with an antenna (step 202). In one example, a voltage associated with the primary antenna 70 of FIG. 1 is measured by the resistive sensor 84 of FIG. 1. In another example, a current associated with the primary antenna 70 of FIG. 1 is measured by the resistive sensor 84 of FIG. 1. The voltage or current values are preferably continuously measured during operation of the telematics unit and provided to the electronic processing device 38 of FIG. 1 for processing.

A determination is made as to whether the voltage or current values indicate that the antenna may not be operating properly (step 204). In one example, the determination is made by the electronic processing device 38 of FIG. 1 as to whether the voltage or current values indicate that the primary antenna 70 of FIG. 1 may not be operating properly using the measured values from step 202. Such an indication may occur, for example, if the current or voltage associated with the primary antenna 70 is outside of a predetermined range of values stored in the memory 40 of FIG. 1. Specifically, the predetermined range is selected such that, when the current or voltage is outside of its respective predetermined range, this may indicate that the antenna is disconnected.

If the determination of step 204 is "yes", then an indicator is placed in memory that the antenna may not be operating properly (step 206). The indicator is preferably stored in the memory 40 of FIG. 1 for subsequent use by the electronic processing device 38 of FIG. 1, as described further below. In either case, regardless of the determination of step 204, the process then proceeds to step 208, described below.

During step 208, measurements are made as to the strength of signals transmitted and/or received by the antenna. The signals preferably pertain to messages sent and received between the primary antenna 70 of FIG. 1 and one or more cell towers 48 of FIG. 1. The strength of the signals are preferably measured by the sensors 86 of FIG. 1 and provided to the electronic processing device 38 of FIG. 1 for processing continuously during operation of the telematics unit 24.

In addition, GPS data is received (step 210). The GPS data pertains to a geographic location of the vehicle. The GPS data is preferably obtained by the GPS chipset/component 42 of FIG. 1 and provided to the electronic processing device 38 of FIG. 1 for processing continuously during operation of the telematics unit 24. In addition, the electronic processing device 38 also preferably retrieves geographic data from the memory 40 of FIG. 1 pertaining to cell towers 48 in proximity to the vehicle. Accordingly, the electronic processing device 38 can use this data in order to determine which cell towers 48 are in proximity to the current location of the vehicle, and to determine expected signal strengths of communications between the telematics unit 24 and these cell towers 48 via the primary antenna 70.

In addition, a signal history is retrieved (step 212). The signal includes a history of signal strengths for communications between the telematics unit 24 of FIG. 1 and the nearby cell towers 48 of FIG. 1 using the primary antenna 70 of FIG. 1. This preferably includes a history of such communications during the current ignition cycle of the vehicle. In addition, this may also include a history of signal strengths of communications between the telematics unit 24 of FIG. 1 (and/or telematics units of other vehicles) and the nearby cell towers 48 of FIG. 1 from previous ignition cycles of the vehicle, and/or similar communications from other vehicles. The signal history is preferably retrieved by the electronic processing device 38 of FIG. 1 from the memory 40 of FIG. 1.

A determination is made as to whether the signal strength and/or other values of steps 208-212 indicate that the antenna may not be operating properly (step 214). In one example, the determination of step 214 is made by the electronic processing device 38 of FIG. 1 as to whether the signal strength values indicate that the primary antenna 70 of FIG. 1 may not be operating properly. Such an indication may occur, for example, if the signal strength value decreases significantly over a relatively short period of time. Such an indication may also occur, by way of further example, if the signal strength value is significantly less than what would be expected in light of the GPS data and/or the signal history.

If the determination of step 214 is "yes", then an indicator is placed in memory that the antenna may not be operating properly (step 216). The indicator is preferably stored in the memory 40 of FIG. 1 for subsequent use by the electronic processing device 38 of FIG. 1, as described further below. In either case, regardless of the determination of step 214, the process then proceeds to step 218, described below.

During step 218, accident data is obtained as to whether the vehicle has been in an accident. The accident data preferably includes a determination as to whether the vehicle has been in an accident. The accident data preferably pertains to whether the vehicle has recently been in one or more particular types of accidents, for example during a current ignition cycle. In one example, the accident data pertains to whether the vehicle has been in a rollover accident during a current ignition cycle for the vehicle. In another example, the accident data pertains to whether the vehicle has been in another particular type of accident during the current ignition cycle that is likely to damage the primary antenna (for example, if a significant force was received by the primary antenna during the accident). The accident data is preferably generated by an accident detection unit of the vehicle, such as the collision sensors 68 and/or the collision sensor interface modules 66 of FIG. 1, and is provided to the electronic processing device of FIG. 1 for processing.

Figure 3:
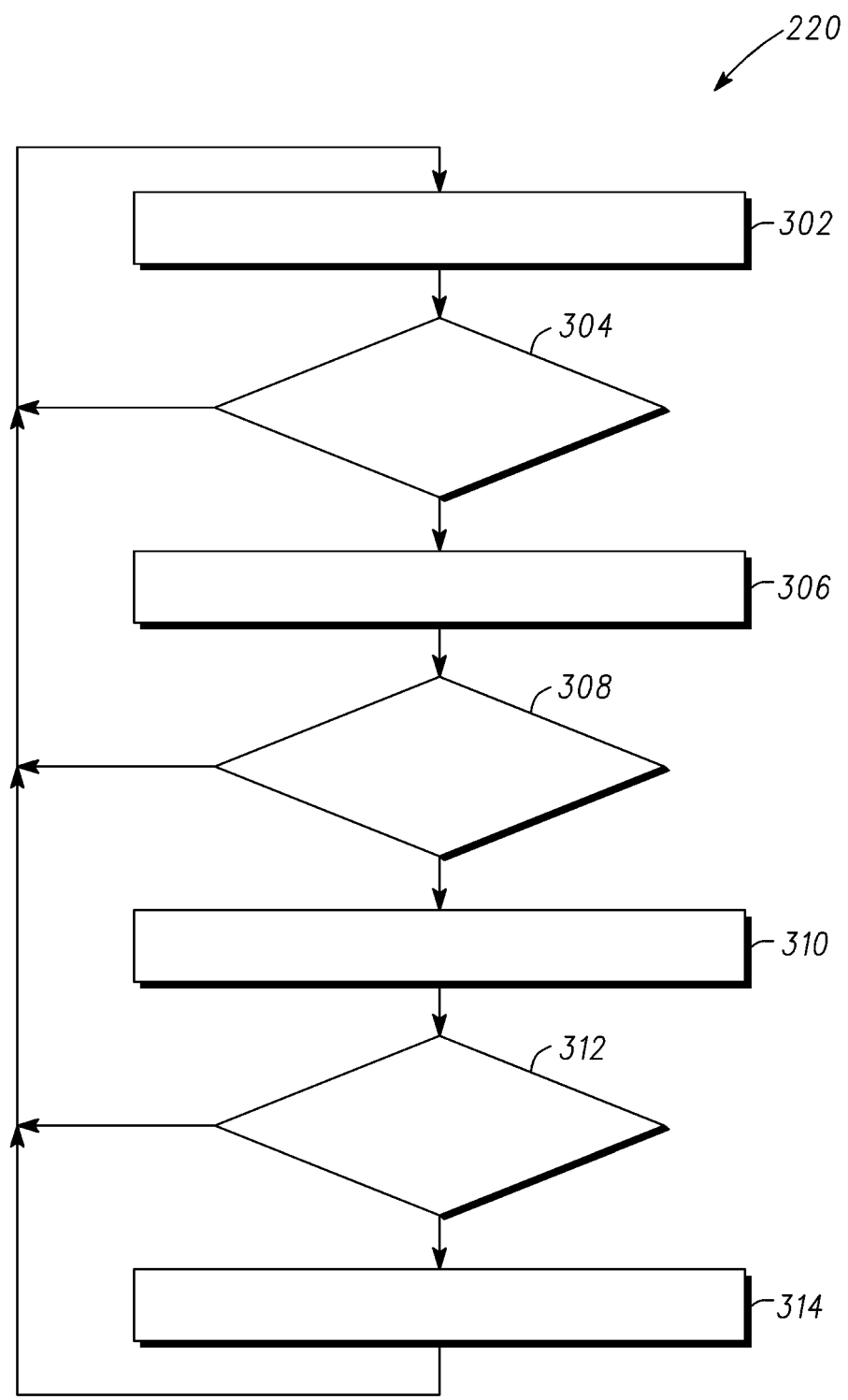
FIG. 3 is a flowchart of a non-limiting example of a process for determining whether a vehicle has been in an accident, and that can be used in connection with the communication system of FIG. 1 and the process of FIG. 2.

With reference to FIG. 3, an illustrative flowchart is provided for step 218 of the process 200 of FIG. 2, namely, the step of obtaining the accident data. As depicted in FIG. 3, the sub-process or step 218 begins with the step of measuring an acceleration of the vehicle (step 302). The acceleration is measured by one of the other vehicle sensors 72 of FIG. 1, namely, by an accelerometer thereof.

If motion is detected by the accelerometer, then a determination is made as to whether a vehicle acceleration measured by the accelerometer is greater than a first predetermined threshold (step 304). The first predetermined threshold is preferably equal to a magnitude of vehicle acceleration that would indicate that a vehicle accident has likely occurred. The first predetermined threshold is preferably expressed in gravity (G) forces, with the amount of the G force varying on a particular vehicle's mass and/or other vehicle characteristics. If it is determined that the vehicle acceleration is less than or equal to the first predetermined threshold, the process returns to step 302, and steps 302 and 304 repeat until there is a determination in a subsequent iteration of step 304 that the vehicle acceleration is greater than the first predetermined threshold.

Once a determination is made in an iteration of step 304 that the vehicle is greater than the first predetermined threshold, a timer is started (step 306). Preferable the timer lasts for approximately ten to fifty milliseconds. A determination is then made as to whether the vehicle acceleration has been greater than the first predetermined threshold for the duration of the timer (step 308).

If it is determined that the vehicle acceleration has not been greater than the first predetermined threshold for the duration of the timer, the process returns to step 302, and steps 302-308 repeat until there is a subsequent determination in an iteration of step 308 that the vehicle acceleration has been greater than the first predetermined threshold for the duration of the timer.

Once a determination is made in an iteration of step 308 that the vehicle acceleration has been greater than the first predetermined threshold for the duration of the timer, a change in vehicle velocity is calculated from the accelerometer 218 over the duration of the timer (step 310). The vehicle velocity may be calculated from the vehicle acceleration values using any one of a number of different mathematical techniques, for example numerical integration and the like.

A determination is then made as to whether the change in vehicle velocity from step 310 is greater than a second predetermined threshold (step 312). The second predetermined threshold is preferably equal to a magnitude of vehicle velocity that would indicate that a vehicle accident has likely occurred. The second predetermined threshold preferably varies based on a particular vehicle's mass and/or other characteristics of the vehicle.

If it is determined that the change in vehicle velocity is less than or equal to the second predetermined threshold, the process returns to step 302, and steps 302-312 repeat until there is a determination in a subsequent iteration of step 312 that the change in vehicle velocity is greater than the second predetermined threshold. Once a determination is made in an iteration of step 312 that the change in vehicle velocity is greater than the second predetermined threshold, then a determination is made that the vehicle has been in an accident (step 314). In one example, as part of step 314, the accident detection unit also determines one or more locations of impact on the vehicle from the accident and measures an amount of force applied to such one or more locations on the vehicle, preferably using one or more of the vehicle sensors 68, 72 of FIG. 1.

In one example, this determination, along with other determinations of the process 300, are made by the electronic processing device 38 of FIG. 3. In other examples, such determinations may be made by the collision sensor interface modules 66 of FIG. 1, and signals representative thereof are provided to the electronic processing device 38 of FIG. 1 for processing. In either case, when it is determined that the vehicle has been in an accident (or that the vehicle has been in a certain type of accident, such as a rollover accident), the electronic processing device 38 of FIG. 1 may utilize this information in determining that the primary antenna 70 of FIG. 1 is not operating properly. In addition, an emergency call is initiated to a call center (such as the call center 18 of FIG. 1). Depending upon the other information also considered by the electronic processing device 38, the call may be initiated by the electronic processing device 38 using the primary antenna 70 or the secondary antenna 71 of FIG. 1.

Returning to FIG. 2, a determination is made as to whether the accident data (and/or determinations) of step 218 indicate that the antenna may not be operating properly (step 220). In one example, the determination is made by the electronic processing device 38 of FIG. 1 as to whether the accident, if any, pertaining to the accident data comprises an accident that is likely to significantly damage the primary antenna 70 of FIG. 1. Such an indication may occur for an antenna disposed on the roof 90 of the vehicle, for example, if a rollover accident has occurred. Such an indication may also occur if it is determined that the type of accident has resulted in a significant force exerted against a location at which the primary antenna 70 is disposed.

If the determination of step 220 is "yes", then an indicator is placed in memory that the antenna may not be operating properly (step 222). The indicator is preferably stored in the memory 40 of FIG. 1 for subsequent use by the electronic processing device 38 of FIG. 1, as described further below. In either case, regardless of the determination of step 220, the process then proceeds to step 224, described below.

During step 224, the information, determinations, and indicators from steps 202-222 are aggregated together and processed, preferably by the electronic processing device 38 of FIG. 1. A determination is made as to whether the antenna is operating properly (step 226). During step 226, the electronic processing device 38 of FIG. 1 preferably makes an aggregate determination as to whether the primary antenna 70 of FIG. 1 is operating properly using the processed aggregate information, determinations, and indicators of step 224. This includes whether any of the indications were placed in memory during steps 206, 216, and/or 222 that the antenna is likely to not be operating properly. In one example, the antenna is determined to be not operating properly if such an indication was placed in memory during any one of steps 206, 216, or 222. In another example, the antenna is determined to be not operating properly if such an indication was placed in memory during at least two of steps 206, 216, and 222. In yet another example, the antenna is determined to be not operating properly if such an indication was placed in memory during all three of 206, 216, and 222.

If it is determined in step 226 that the antenna is operating properly, then communications are made using the antenna (step 228). Specifically, in one example, during step 228, communications are made to the call center 18 of FIG. 1 by the electronic processing device 38 of FIG. 1 using the cellular chipset/component 34 of FIG. 1 and the primary antenna 70 of FIG. 1. Such communications may include routine communications with the call center 18. In the case of an accident (for example as determined in steps 218 and/or 220) or other emergency, the communications may also include an emergency call to the call center 18 for assistance.

Conversely, if it is determined in step 226 that the antenna is not operating properly, then communications are made using an alternate communication device (step 230). Specifically, in one example, the alternate communication device is first selected by aggregating data as to a secondary antenna (step 232). In one example, steps 202-224 are conducted with respect to the secondary antenna 71 of FIG. 1, and a determination is then made as to whether the secondary antenna 71 is operating properly (step 234).

If it is determined in step 234 that the secondary antenna is operating properly, then communications are made using the secondary antenna (step 236). Specifically, in one example, during step 236, communications are made to the call center 18 of FIG. 1 by the electronic processing device 38 of FIG. 1 using the cellular chipset/component 34 of FIG. 1 and the secondary antenna 71 of FIG. 1. Such communications may include routine communications with the call center 18. In the case of an accident (for example as determined in steps 218 and/or 220) or other emergency, the communications may also include an emergency call to the call center 18 for assistance.

Conversely, if it is determined in step 234 that the secondary antenna is not operating properly, then communications are made using a cellular device of an occupant of the vehicle (step 238). Specifically, in one example, during step 238, communications are made to the call center 18 of FIG. 1 by the electronic processing device 38 of FIG. 1 using the cellular chipset/component 34 of FIG. 1 and the cellular telephone 73 of FIG. 1. Such communications may include routine communications with the call center 18. In the case of an accident (for example as determined in steps 218 and/or 220) or other emergency, the communications may also include an emergency call to the call center 18 for assistance. During step 238, the electronic processing device 38 and/or the cellular chipset/component 34 of FIG. 1 are paired with the cellular telephone 73 of FIG. 1, and the communications are then sent through the cellular telephone 73 to the call center 18 of FIG. 1.

Accordingly, improved telematics systems are provided, along with improved methods for communicating using telematics units. A disclosed telematics system includes a primary antenna, a secondary antenna, a cellular chipset/component, and an electronic processing device. The electronic processing device monitors parameters indicative as to whether the primary antenna is operating properly, and determines whether the primary antenna is operating properly using one or more of these parameters. The electronic processing device communicates with a call center using the cellular chipset/component and the primary antenna when the primary antenna is operating properly. The electronic processing device communicates with the call center using the cellular chipset/component and the secondary antenna when the primary antenna is not operating properly. In one example, the electronic processing device communicates with the call center using the cellular chipset/component and a telephone of an occupant of the vehicle when neither the primary antenna nor the secondary antenna are operating properly.

It will be appreciated that the disclosed systems and components thereof may differ from those depicted in the figures and/or described above. For example, the communication system 10, the telematics unit 24, and/or various parts and/or components thereof may differ from those of FIG. 1 and/or described above. It will similarly be appreciated that the steps of the process 200 of FIG. 2 and/or the process 300 of FIG. 3 may differ from those depicted in the Figures and/or described above. Likewise, certain steps of the steps of the process 200 of FIG. 2 and/or the process 300 of FIG. 3 may occur in a different order than that depicted in the Figures and/or described above, and/or certain of the steps may occur simultaneously with one another. Similarly, it will similarly be appreciated that, while the disclosed systems are described above as being used in connection with automobiles such as sedans, trucks, vans, and sports utility vehicles, the disclosed systems may also be used in connection with any number of different types of vehicles, and in connection with any number of different systems thereof and environments pertaining thereto.

While at least one example has been presented in the foregoing detailed description, it should be appreciated that a vast number of variations exist. It should also be appreciated that the detailed description represents only examples, and is not intended to limit the scope, applicability, or configuration of the invention in any way. Rather, the foregoing detailed description will provide those skilled in the art with a convenient road map for implementing the examples. It should be understood that various changes can be made in the function and arrangement of elements without departing from the scope of the invention as set forth in the appended claims and the legal equivalents thereof.

What is claimed is:

1. A telematics system for a vehicle, the telematics system comprising:
   a first antenna disposed at a first location on the vehicle;
   a second antenna disposed at a second location on the vehicle, the second location being remote from the first location; and
   a processing device coupled to the first antenna and the second antenna and configured to:
      monitor a voltage or current of the first antenna;
      communicate using the first antenna if the voltage or current is within a predetermined range; and
      communicate using the second antenna if the voltage or current is not within the predetermined range.

2. The telematics system of claim 1, further comprising:
   a cellular chipset, wherein the processing device is configured to:
      communicate with a call center using the cellular chipset and the first antenna if the voltage or current is within the predetermined range; and
      communicate with the call center using the cellular chipset and the second antenna if the voltage or current is not within the predetermined range.

3. The telematics system of claim 1, wherein:
   the first location is on a first side of the vehicle; and
   the second location is on a second side of the vehicle that is remote from the first side.

4. The telematics system of claim 1, wherein:
   the first location is on a roof of the vehicle; and
   the second location is on a bumper of the vehicle.

5. The telematics system of claim 1, wherein:
   the first location is on a roof of the vehicle; and
   the second location is underneath the vehicle.

6. The telematics system of claim 1, further comprising:
   a sensor associated with the first antenna and configured to measure a strength of a signal associated with the first antenna, wherein the processing device is further configured to use the second antenna instead of the first antenna based at least in part on the strength of the signal.

7. The telematics system of claim 1, wherein the processing device is coupled to an accident detection unit of the vehicle that is configured to provide an indication as to whether the vehicle has been in an accident, and the processing device is configured to use the second antenna instead of the first antenna based at least in part on whether the vehicle has been in the accident.

8. The telematics system of claim 1, wherein the processing device is further configured to:
   monitor a parameter that is indicative as to whether the second antenna is operational; and
   communicate with a telephone of an occupant of the vehicle if the voltage or current is not within the predetermined range and the parameter indicates that the second antenna is not operational.

9. A method for communicating via a telematics system of a vehicle, the telematics system having a first antenna disposed at a first location of the vehicle and a second antenna disposed at a second location of the vehicle that is remote from the first location, the method comprising the steps of:
   monitoring a current or voltage of the first antenna;
   communicating using the first antenna if the voltage or current is within a predetermined range; and
   communicating using the second antenna if the voltage or current is not within the predetermined range.

10. The method of claim 9, wherein:
    the step of monitoring the current or voltage comprises monitoring the voltage;

the step of communicating using the first antenna comprises communicating using the first antenna if the voltage is within a predetermined voltage range; and the step of communicating using the second antenna comprises communicating using the second antenna if the voltage is not within the predetermined voltage range.

11. The method of claim 9, wherein:

the step of monitoring the current or voltage comprises monitoring the current;

the step of communicating using the first antenna comprises communicating using the first antenna if the current is within a predetermined current range; and the step of communicating using the second antenna comprises communicating using the second antenna if the current is not within the predetermined current range.

12. The method of claim 9, further comprising the step of:

measuring a strength of a signal associated with the first antenna, wherein the second antenna is used instead of the first antenna based at least in part on the strength of the signal.

13. The method of claim 9, further comprising the step of:

receiving an indication as to whether the vehicle has been in an accident, wherein the second antenna is used instead of the first antenna based at least in part on whether the vehicle has been in an accident.

14. The method of claim 9, further comprising the steps of:

monitoring a parameter that is indicative as to whether the second antenna is operational; and communicating with a telephone of an occupant of the vehicle if the voltage or current is not within the predetermined range and the parameter indicates that the second antenna is not operational.

\* \* \* \* \*